United States Patent
Pueschner et al.

(10) Patent No.: US 9,672,459 B2
(45) Date of Patent: Jun. 6, 2017

(54) CHIP CARD WITH INTEGRATED ACTIVE COMPONENTS

(71) Applicants: Infineon Technologies AG, Neubiberg (DE); Bundesdruckerei GmbH, Berlin (DE)

(72) Inventors: Frank Pueschner, Kelheim (DE); Joerg Fischer, Berlin (DE); Juergen Hoegerl, Regensburg (DE); Peter Stampka, Burglengenfeld (DE); Markus Tietke, Berlin (DE); Stefan Troelenberg, Mittenwalde (DE)

(73) Assignees: INFINEON TECHNOLOGIES AG, Neubiberg (DE); BUNDESDRUCKEREI GMBH, Berlin (DE)

( * ) Notice: Subject to any disclaimer, the term of this patent is extended or adjusted under 35 U.S.C. 154(b) by 0 days.

(21) Appl. No.: 14/771,240

(22) PCT Filed: Feb. 27, 2014

(86) PCT No.: PCT/EP2014/053825
§ 371 (c)(1),
(2) Date: Aug. 28, 2015

(87) PCT Pub. No.: WO2014/131830
PCT Pub. Date: Sep. 4, 2014

(65) Prior Publication Data
US 2016/0004947 A1    Jan. 7, 2016

(30) Foreign Application Priority Data
Feb. 28, 2013 (DE) .................. 10 2013 102 003

(51) Int. Cl.
*G06K 19/00* (2006.01)
*G06K 19/077* (2006.01)
*G06K 19/073* (2006.01)

(52) U.S. Cl.
CPC . *G06K 19/07705* (2013.01); *G06K 19/07309* (2013.01); *G06K 19/07722* (2013.01); *G06K 19/07749* (2013.01); *G06K 19/07754* (2013.01)

(58) Field of Classification Search
USPC ................ 235/435, 439, 441, 454, 487, 492
See application file for complete search history.

(56) References Cited

U.S. PATENT DOCUMENTS

2006/0164004 A1    7/2006  Rossner
2008/0296606 A1*  12/2008  Ottobon ............. G06K 19/0728
                                                                257/100

(Continued)

FOREIGN PATENT DOCUMENTS

CN    101800445 A    8/2010
DE    10252357 A1    5/2004

(Continued)

OTHER PUBLICATIONS

International Search Report received for the PCT application PCT/EP2014/053825 mailed on Sep. 8, 2014 (5 pages including 2 pages of English translation).

*Primary Examiner* — Matthew Mikels
(74) *Attorney, Agent, or Firm* — Viering, Jentschura & Partner mbB

(57) ABSTRACT

In various embodiments, a chip card module is provided that can have: a chip card module support; a wiring structure that is arranged on the chip card module support; an integrated circuit that is arranged on the chip card module support and is electrically coupled to the wiring structure; a chip card module antenna that is arranged on the chip card module (Continued)

support and is electrically coupled to the wiring structure, and a lighting device that is arranged on the chip card module support and is electrically coupled to the wiring structure.

18 Claims, 8 Drawing Sheets

(56) References Cited

U.S. PATENT DOCUMENTS

| | | |
|---|---|---|
| 2010/0171586 A1 | 7/2010 | Park et al. |
| 2010/0194331 A1 | 8/2010 | Lai et al. |
| 2013/0140371 A1 | 6/2013 | Omura et al. |

FOREIGN PATENT DOCUMENTS

| | | |
|---|---|---|
| DE | 102008041306 A1 | 2/2010 |
| DE | 102010020460 A1 | 11/2011 |
| EP | 2131312 A1 | 12/2009 |
| TW | 201214295 A | 4/2012 |
| TW | M430662 U | 6/2012 |
| TW | M439221 U | 10/2012 |
| TW | M445225 U | 1/2013 |
| TW | M445226 U | 1/2013 |
| WO | 2004082032 A2 | 9/2004 |
| WO | 2006100206 A1 | 9/2006 |
| WO | 2010020558 A1 | 2/2010 |

* cited by examiner

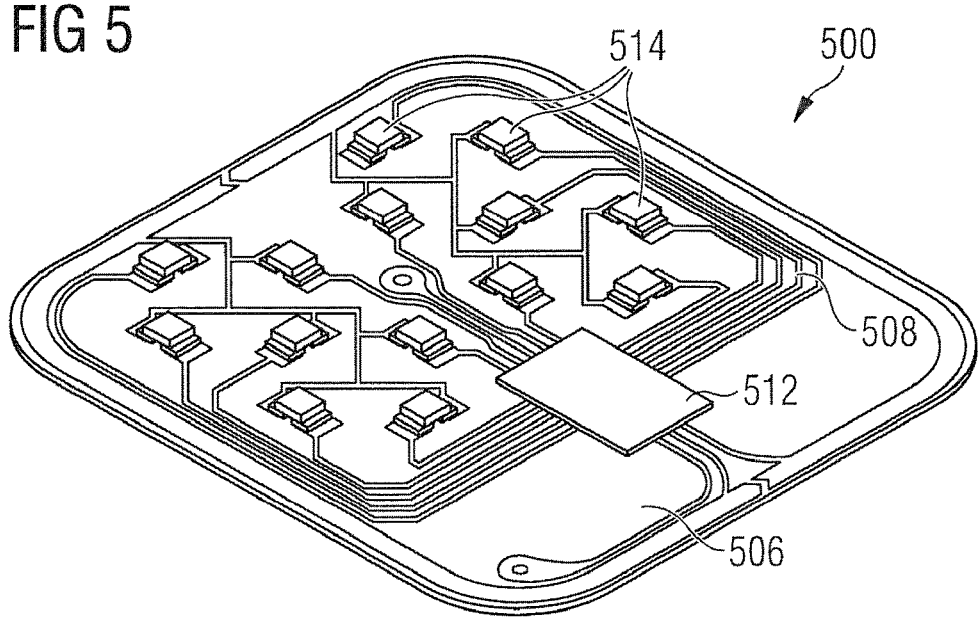
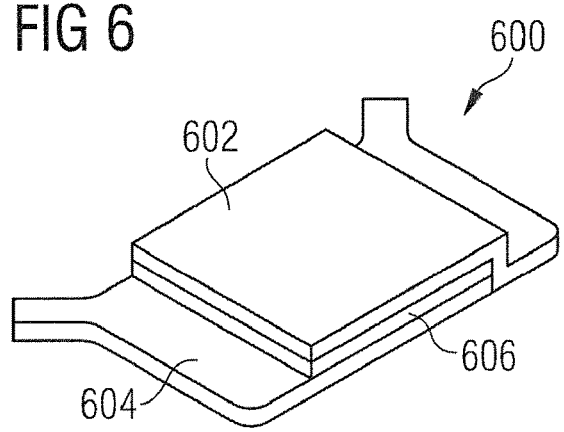

CHIP CARD WITH INTEGRATED ACTIVE COMPONENTS

RELATED APPLICATIONS

The present application is a national stage entry according to 35 U.S.C. §371 of PCT application No.: PCT/EP2014/053825 filed on Feb. 27, 2014, which claims priority from German application No.: 10 2013 102 003.8 filed on Feb. 28, 2013, and is incorporated herein by reference in its entirety.

TECHNICAL FIELD

With increasing prevalence of electronic (identity) documents such as the electronic personal identity card, for instance, which as chip card replaces the simple paper document used heretofore, their security against manipulation is increasingly being scrutinized. Security plays a major part not only in electronic systems establishing proof of identity but also in chip-card-based payment systems, for example.

BACKGROUND

In order to increase the security of electronic documents against manipulation, customary measures can be implemented at the document level, such as, for instance, the provision of additional security layers that are intended to make external access more difficult. At the semiconductor level, in addition, secure chips can be used and even the software that runs thereon can be designed from the standpoint of security.

Furthermore, user-supported security features can be used on chip cards, wherein here a chip card can be regarded as an exemplary embodiment of an electronic document and/or of a proof of identity. In this regard, chip cards may include alphanumeric displays which, in interaction with the chip integrated in the chip card, can represent character sequences which can ultimately be used for authorizing activities such as accesses to buildings or cash payments. In one concrete example, a random secret number could be displayed on a display of the chip card, which the user of the chip card can use to identify himself/herself as authorized person in a process, for example taking out money at an automatic teller machine. In this case, the required energy for operating the display and further electronic components within the chip card can be drawn from a communication field in the form of a magnetic field of the automatic teller machine as reader.

Only designs in which the chip and the display element (for example an LCD display) constitute separate components, and chips which include integrated LED elements are known at the present time. However, the associated connection system between the chip incorporated in the chip card and the display element constitutes a potential target for manipulations. In this regard, a potential attacker could intervene in the signal path, for instance, in order to constrain an incorrect representation on the display element and to intercept the authentic identification characters in the process. Moreover, the required connection system causes an increased assembly outlay at the chip card level and entails the risk of failures of the overall system, for instance on account of cable- or line-break-governed interruptions at the connection system.

The patent application DE 10 2008 041 306 A1 describes a chip card including an integrated circuit and a conversion region arranged above the integrated circuit. The integrated circuit includes transmitting means for transmitting radiation to the conversion region and receiving means for receiving the converted radiation from the conversion region. Said chip card is an RFID chip card.

The patent application DE 10 2010 020 460 A1 describes a valuable document in the form of a chip card including an integrated RFID circuit including sensor elements and a light emitting element. However, for communication with the outside world, the integrated RFID circuit is coupled to an antenna arranged within the chip card by electrical and thus wear-susceptible interfaces.

SUMMARY

In various embodiments, a chip card module is provided, which may include: a chip card module carrier; a wiring structure, which is arranged on the chip card module carrier; an integrated circuit, which is arranged on the chip card module carrier and is electrically coupled to the wiring structure; a chip card module antenna, which is arranged on the chip card module carrier and is electrically coupled to the wiring structure; and a lighting device, which is arranged on the chip card module carrier and is electrically coupled to the wiring structure.

The chip card module can be a major constituent of chip cards (also called smart cards), wherein chip card standards are defined by the ISO/IEC 7810 standard and the ISO/IEC 7816 standard, for example. Furthermore, the chip card can be a contactless chip card, according to the ISO/IEC 14443 standard. Data can be exchanged between the chip card and a reading unit for example in accordance with the NFC transmission standard (NFC: near field communication) at a frequency of 13.56 MHz.

The chip card module in accordance with various embodiments can be present in a manner embedded in a chip card and/or it can be part of a valuable and/or security document. A valuable and/or security document can be taken to mean, for example, a personal identity card, a passport, a driver's license, a bank card, a credit card, an access identity card, a membership identity card, an authentication token, a vehicle registration certification, a vehicle registration document, a share, a banknote, a check, a postage stamp, excise stamps, etc. The chip card module as such can be embedded in a chip card or else be part of a valuable and/or security document, for example a page in a passport.

A chip card module embedded in a chip card may include a chip, that is to say an integrated circuit, which can contain logic and memory circuits (or blocks) and thus determines the functional scope of the chip card. In this case, the wiring structure constitutes the electrical connection infrastructure for the components/structural parts situated on the chip card module (such as, for instance, coils or capacitors). In general, a chip card can communicate with readers in a contact-based manner or contactlessly or, alternatively, can be designed as a dual interface chip card, that is to say include means both for contact-based communication and for contactless communication. A chip card module of a customary contact-based chip card includes a contact field which is exposed on the surface of the chip card and can be contacted by contacts of a reader. A chip card module of a contactless chip card may include a chip card module antenna, for example a coil in the form of conductor track turns. The common arrangement of the coil and the chip on a chip card module is also designated as CoM (Coil on Module). In order to enable wireless communication over relatively large distances, which is difficult to realize on account of the relatively small size of the chip card module antenna, a chip card antenna can be provided in the chip card, to which chip card antenna the chip card module antenna can couple inductively. Alternatively, the chip card module antenna can also be omitted and the chip card module can be electrically coupled to the chip card antenna. The chip card antenna is usually a large-format antenna in the form of conductor track turns which can be provided in a further layer of the chip card and, in principle, can extend within said layer (or on a surface of said layer) onto the entire region of the chip card which may usually be the case for example for chip cards in the ID-1 format in accordance with the ISO/IEC 7810 standard. However, the chip card antenna can also extend only over a partial region of the chip card, for example approximately over half of a chip card, as is usually the case for chip cards in the ID-3 format in accordance with ISO/IEC 7810, such that the chip card antenna then has a size comparable to that in the case of a chip card in the ID-1 format. The chip card antenna then provides the external wireless (i.e. contactless) communication interface to a reader. When the chip card antenna is used in interaction with a chip card module antenna arranged on the chip card module, the chip card antenna is designated as a booster antenna (amplifier antenna). A dual interface chip card can then be understood as a combination of a contact-based and a contactless chip card and correspondingly includes both communication interfaces.

On the chip card module described here in accordance with various embodiments (for example on the chip card module carrier or the chip card module carrier layer on which the wiring structure is applied), moreover, a lighting device is arranged, which can function as a display, for example. The lighting device is therefore not a separate component which would have to be connected for example to the chip or a separate driving unit on the chip card module, rather it is a constituent of the chip card module. To put it another way, in the case of the chip card module in accordance with various embodiments, the chip, the wiring structure (connecting conductor track structure), and the lighting device can all be integrated jointly in/on a chip card module, which, moreover, can also be laminated or sealed and can thus constitute a cohesively encapsulated unit.

By virtue of this joint integration, the security of the lighting device against manipulation can be increased by the access to the wiring structure and thus the electrical connection between the lighting device and the chip being made considerably more difficult since the chip card module is usually laminated in the chip card body and/or is covered by further layers of the chip card. In addition, the assembly outlay at the chip card level can be minimized since now only one component—precisely the chip card module in accordance with various embodiments—need be incorporated. In the case of a contactless coupling to the chip card antenna by the chip card module antenna arranged on the chip card module, for instance a coil, a reliable and robust, inherently encapsulated chip card module can thus be provided.

In accordance with further embodiments of the chip card module, the chip card module carrier may include a non-conductive carrier substrate.

In accordance with further embodiments of the chip card module, the wiring structure can be formed on one side of the chip card module carrier.

In accordance with further embodiments of the chip card module, the wiring structure can be formed on both sides of the chip card module carrier.

In accordance with further embodiments of the chip card module, the integrated circuit can be designed to drive the lighting device.

In accordance with further embodiments of the chip card module, the lighting device may include a plurality of discrete illuminants.

In accordance with further embodiments of the chip card module, the integrated circuit can be designed to drive the plurality of discrete illuminants in a multiplex method.

In accordance with further embodiments of the chip card module, the lighting device can be designed as a touch-sensitive input means. The touch sensitivity can be based for example on a variation of a discharge behavior of the discrete illuminants of the lighting device, which behavior can change if a user brings his/her finger in direct proximity to the illuminants, for example against the surface of the chip card. In such a case, with the use of LEDs as illuminants, the inherent capacitance thereof can change and thus influence the discharge behavior.

In accordance with further embodiments of the chip card module, at least one of the plurality of discrete illuminants can be designed as an LED chip.

In accordance with further embodiments of the chip card module, at least one of the plurality of discrete illuminants can be designed as an LED chip encapsulated in a housing.

In accordance with further embodiments of the chip card module, at least one of the plurality of discrete illuminants can be designed as an organic LED.

In accordance with further embodiments of the chip card module, the wiring structure and the lighting device can be formed integrally with the chip card module carrier.

In accordance with further embodiments of the chip card module, the lighting device and the integrated circuit can be arranged on the same side of the chip card module carrier.

In accordance with further embodiments of the chip card module, the lighting device and the integrated circuit can be arranged on different sides of the chip card module carrier.

In accordance with further embodiments of the chip card module, the lighting device can be designed for emitting a non-cognitively detectable signal. The non-cognitively detectable signal can be implemented, for example, by a frequency-modulated, amplitude-modulated or phase-modulated light emission. In this case, the modulation of the light emission can be configured such that it can be detected and evaluated only by machine, for example by a correspondingly designed reader, but cannot be perceived by the user with the naked eye. Likewise, cognitively detectable and cognitively non-detectable information can be transmitted in a multiplex method, wherein the time intervals in which the light emission of the lighting device is modulated merge optically for the user with time intervals in which the light emission of the lighting device is not modulated, such that with the naked eye the user does not perceive any fluctuation of the image information presented to the user by the chip card module in accordance with various embodiments (or correspondingly the associated chip card). The modulation of the light emission of the lighting device can be carried out not only temporally but also spatially, such that, for instance, one partial region of the lighting device emits non-cognitively detectable data, while another partial region of the lighting device emits cognitively detectable data. The spatial modulation can also be carried out in such a way that the lighting device represents two-dimensional patterns as a segment bar code. The spatial modulation of the light emission can, of course, also be combined with the temporal modulation of the light emission.

In accordance with further embodiments of the chip card module, the chip card module carrier can furthermore include a reinforced region, in which the integrated circuit is arranged.

In accordance with further embodiments of the chip card module, the reinforced region may include a material layer having a higher stiffness value than the chip card module carrier.

In accordance with further embodiments of the chip card module, the material layer can be arranged on the chip card module carrier between the integrated circuit and the chip card module carrier.

In accordance with further embodiments of the chip card module, the material layer can be arranged below the integrated circuit on the opposite side of the chip card module carrier relative to the integrated circuit.

In accordance with further embodiments, the chip card module may include a coil, which is arranged on the chip card module carrier and is electrically coupled to the wiring structure.

In accordance with further embodiments of the chip card module, the coil and the lighting device can be formed on different sides of the chip card module carrier.

In accordance with further embodiments, the chip card module can furthermore contain a ring arranged in a manner running along the edge region of the chip card module carrier thereon.

In accordance with further embodiments of the chip card module, a transparent covering layer can be arranged above a surface of the chip card module carrier on which the lighting device is arranged.

In accordance with further embodiments of the chip card module, a region above the chip card module carrier which is laterally delimited by the ring can be filled with a covering material.

In accordance with further embodiments of the chip card module, the transparent covering layer can be provided in the form of a cap composed of a potting material.

In accordance with further embodiments of the chip card module, the ring can bear against a circumferential edge of the covering layer.

In accordance with further embodiments of the chip card module, the covering material can be transparent to the light generated by the lighting device.

In accordance with further embodiments of the chip card module, the covering material can be formed from a potting compound.

In accordance with further embodiments of the chip card module, the lighting device can be directly electrically coupled to the chip card module antenna, without being coupled to the integrated circuit in a controllable manner. This can also hold true only for a portion of the lighting device, for example for a portion of the discrete illuminants of the lighting device.

In various embodiments, a method for producing a chip card module is provided, wherein the method may include: providing a chip card module carrier; forming a wiring structure on the chip card module carrier; forming an integrated circuit on the chip card module carrier, such that the integrated circuit is electrically coupled to the wiring structure; forming a chip card module antenna on the chip card module carrier, such that the chip card module antenna is electrically coupled to the wiring structure; and forming a lighting device on the chip card module carrier, such that the lighting device is electrically coupled to the wiring structure.

In accordance with further embodiments of the method, the chip card module carrier can be formed from a nonconductive carrier substrate.

In accordance with further embodiments of the method, the wiring structure can be formed on one side of the chip card module carrier.

In accordance with further embodiments of the method, the wiring structure can be formed on both sides of the chip card module carrier.

In accordance with further embodiments of the method, forming the lighting device may include forming a plurality of discrete illuminants.

In accordance with further embodiments of the method, at least one of the plurality of discrete illuminants can be formed as an LED chip.

In accordance with further embodiments of the method, at least one of the plurality of discrete illuminants can be formed as an LED chip encapsulated in a housing.

In accordance with further embodiments of the method, at least one of the plurality of discrete illuminants can be formed as an organic LED.

In accordance with further embodiments of the method, the wiring structure and the lighting device can be formed integrally with the chip card module carrier.

In accordance with further embodiments of the method, the lighting device and the integrated circuit can be formed on the same side of the chip card module carrier.

In accordance with further embodiments of the method, the lighting device and the integrated circuit can be formed on different sides of the chip card module carrier.

In accordance with further embodiments, the method can furthermore include forming a reinforced region on the chip card module carrier, in which the integrated circuit is arranged.

In accordance with further embodiments of the method, the reinforced region can be formed from a material, for example a material layer, which has a higher stiffness than the chip card module carrier.

In accordance with further embodiments of the method, the material layer can be formed on the chip card module carrier between the integrated circuit and the chip card module carrier.

In accordance with further embodiments of the method, the material layer can be formed below the integrated circuit on the opposite side of the chip card module carrier relative to the integrated circuit.

In accordance with further embodiments, the method can furthermore include forming a coil on the chip card module carrier, said coil being electrically coupled to the wiring structure.

In accordance with further embodiments of the method, the coil can be formed on the opposite side of the chip card module carrier relative to the lighting device.

In accordance with further embodiments, the method can furthermore include forming a ring on the chip card module carrier, which is arranged along the edge region of the chip card module carrier on the chip card module carrier.

In accordance with further embodiments, the method can furthermore include filling a region above the chip card module carrier, which is laterally delimited by the ring, with a covering material.

In accordance with further embodiments of the method, the covering material can be transparent to the light generated by the lighting device.

In accordance with further embodiments of the method, the covering material can be formed from a potting compound.

In various embodiments, a chip card is provided, which may include the chip card module in accordance with various embodiments, wherein the chip card module is completely surrounded by a chip card material.

The chip card in accordance with various embodiments can be a dual interface chip card or a contactless chip card. In an embodiment as a contactless chip card, it is possible to dispense with contact locations (contact-connections) within the chip card with the exception of the module. If, in addition to the chip card module, a booster antenna is provided in the chip card, then there are no further contact locations and the chip card in accordance with various embodiments can thus have a particularly high stability.

Furthermore, in the chip card in accordance with various embodiments, a driver circuit for the lighting device, for example a driver chip, can be dispensed with since the lighting device can be driven directly by the chip of the chip card module in accordance with various embodiments. By dispensing with the driver chip, it is thus possible to reduce a potential possibility for attacking the chip of the chip card module. The direct driving of the lighting device (for example LEDs or OLEDs) can contribute to increasing the overall security even of the chip itself and thus of the data stored in the chip.

In accordance with further embodiments of the chip card, the chip card module can be arranged in a depression within a chip card layer.

In accordance with further embodiments of the chip card, the chip card material can be formed by further chip card layers.

In accordance with further embodiments of the chip card, the chip card layer can be arranged between two of the further chip card layers.

In accordance with further embodiments of the chip card, the upper area formed by the surface of the covering material of the chip card module can terminate flush with the upper area of the chip card layer in which the chip card module is arranged.

In accordance with further embodiments of the chip card, the chip card material at least in a volume above the lighting device can be transparent to the light emitted by the lighting device.

In accordance with further embodiments of the chip card, the lighting device can be designed as a display for representing alphanumeric characters.

The chip card can furthermore include a diffuser, that is to say for example a diffusely scattering medium, such as a diffuser film, for instance. The diffuser can be arranged in a layer which can be arranged for example on a display module and/or a compensation film. By way of example, opaque films having a thickness of 50 to 200 µm, preferably having a thickness of 100 µm, can be used as diffuser. The diffuser has the effect that from an in particular point light source having a very narrow emission characteristic, light is emitted by scattering in a larger solid angle. The scattering is achieved for example by particles having a diameter that is greater than half the wavelength of the light, that is to say for visible light, for example particles which are larger than 200 nm. By way of example, $TiO_2$, $SiO_2$ and $ZnO$ are preferred for said particles. In a further embodiment, the particles forming the diffuser are applied to a film in the form of a printing ink, wherein the printing methods of relief, planographic, intaglio, screen or digital printing, particularly preferably offset, screen or ink jet printing, can be used for this purpose. By way of example, a mask is arranged above the diffuser. By way of example, the mask has a rectangular shape. In this way, from a very small LED it is possible to produce a light source giving a bar-shaped impression, as is required for a segment display. The mask consists of light-absorbing material, for example a printing ink containing carbon black. As a result, the cognitive perceptibility is significantly increased and the integration of very small illuminants of very compact design is thus made possible.

Furthermore, an encapsulation material can be applied for example on or above a display module, which encapsulation material optionally fills the free regions between the chip and the lighting device. The encapsulation material may include at least one security material. A security material can change the properties of the light emitted by the lighting device, for example the spectrum, response time and/or decay behavior of said light. For this purpose, the following security materials, for example, can be provided in the encapsulation material: fluorescent or phosphorescent substances, dyes for filtering the emitted light, conversion phosphors (e.g. upconversion (light frequency upconversion) or downconversion (light frequency upconversion)) for shifting the emission spectrum of the emitted light, effect pigments. By virtue of the security material, further information features can be impressed on the light emitted by the lighting device, which information features can be measured/evaluated as "$2^{nd}$-level feature" (second-level features) or "$3^{rd}$-level feature (third-level features) by verification devices, for example correspondingly designed readers, in order the authenticity of the associated chip card in accordance with various The security material can also be utilized, with the use of commercially available LED components and/or OLED components as illuminants of the lighting device, for incorporating a security feature in order to prevent exchange for other illuminants that are driven via a different, for instance, corrupted chip (instead of the authentic chip).

In further various embodiments, a method for producing a chip card is provided, wherein the production method may include: producing a chip card module in accordance with various embodiments and arranging the chip card module in a chip card body, such that the chip card module is completely surrounded by the chip card body.

In accordance with further embodiments of the method, arranging the chip card module in a chip card body may include: forming a depression in a chip card layer of the chip card body; and arranging the chip card module in the depression.

In accordance with further embodiments, the method can furthermore include providing further chip card layers above and/or below the chip card layer having the chip card module.

In accordance with further embodiments of the method, the depression can be formed in such a way that the upper area formed by the surface of the covering material of the chip card module terminates flush with the upper area of the chip card layer which has the chip card module.

In accordance with further embodiments of the method, the chip card body at least in a volume above the lighting device of the chip card module can be designed to be transparent to the light emitted by the lighting device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIG. 5 shows yet another embodiment of the chip card module;

FIG. 6 shows an exemplary illuminant which can be arranged in the chip card module in accordance with various embodiments;

DETAILED DESCRIPTION

In the following detailed description, reference is made to the accompanying drawings, which form part of this description and show for illustration purposes specific embodiments in which the invention can be implemented. In this regard, direction terminology such as, for instance, "at the top", "at the bottom", "at the front", "at the back", "front", "rear", etc. is used with respect to the orientation of the figure(s) described. Since components of embodiments can be positioned in a number of different orientations, the direction terminology serves for illustration and is not restrictive in any way whatsoever. It goes without saying that other embodiments can be used and structural and logical changes can be made, without departing from the scope of protection of the present invention. It goes without saying that the features of the various embodiments described herein can be combined with one another, unless specifically indicated otherwise. Therefore, the following detailed description should not be interpreted in any restrictive sense, and the scope of protection of the present invention is defined by the appended claims.

In the context of this description, the terms "connected" and "coupled" are used to describe both a direct and an indirect connection and a direct or indirect coupling. In the figures, identical or similar elements are provided with identical reference signs, insofar as this is expedient.

Figure 1:
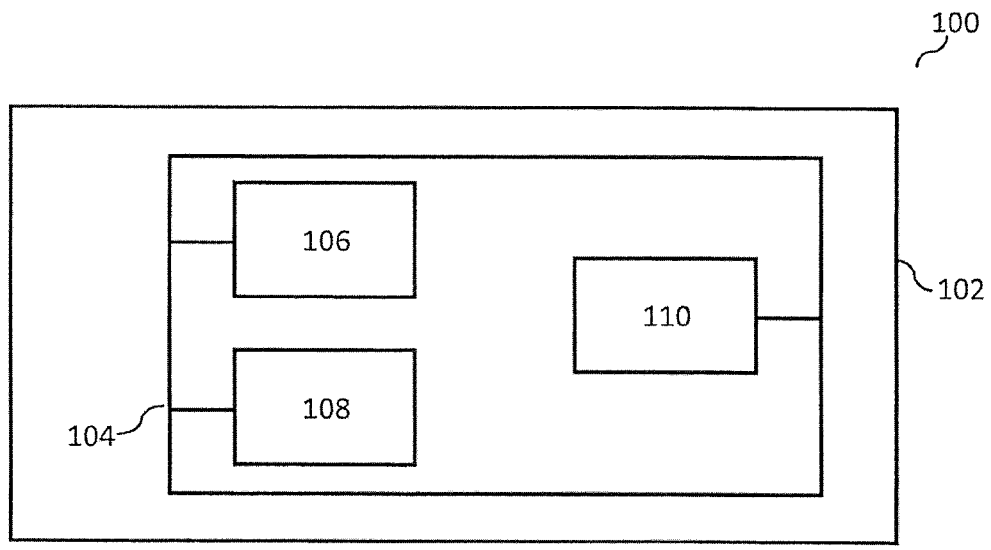
FIG. 1 shows a schematic illustration of a chip card module in accordance with various embodiments.

FIG. 1 shows one embodiment of a chip card module 100. The chip card module 100 includes a chip card module carrier 102. A wiring structure 104 is formed on the chip card module carrier 102. Furthermore, there are arranged on the chip card module carrier 102 an integrated circuit 106, which is electrically coupled to the wiring structure 104, a chip card module antenna 110 which is arranged on the chip card module carrier and is electrically coupled to the wiring structure; and a lighting device 108, which is likewise electrically coupled to the wiring structure 104.

Figure 2:
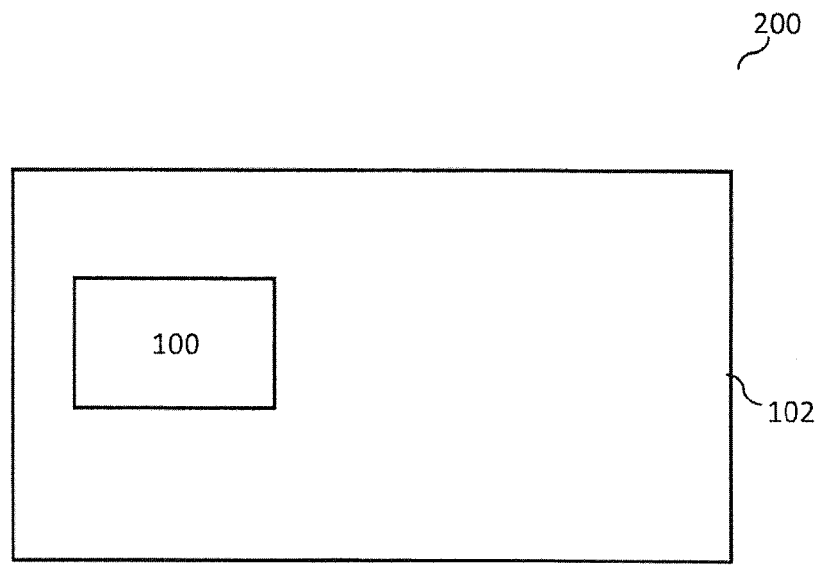
FIG. 2 shows a schematic illustration of an exemplary chip card in which the chip card module in accordance with various embodiments is integrated.

FIG. 2 shows a schematic illustration of an exemplary chip card 200 in which the chip card module 100 in accordance with various embodiments can be integrated. The exemplary chip card 200 may include a chip card material 202, which can be present in the form of chip card layers, for example. The chip card module 100 in accordance with various embodiments can in this case be arranged/integrated in the exemplary chip card 200 in such a way that the chip card module 100 is completely surrounded by the chip card material 202. In this case, the chip card module 100 in accordance with various embodiments can be present in a manner embedded/laminated in a chip card layer and this chip card layer can be surrounded by further chip card layers.

Figure 3:
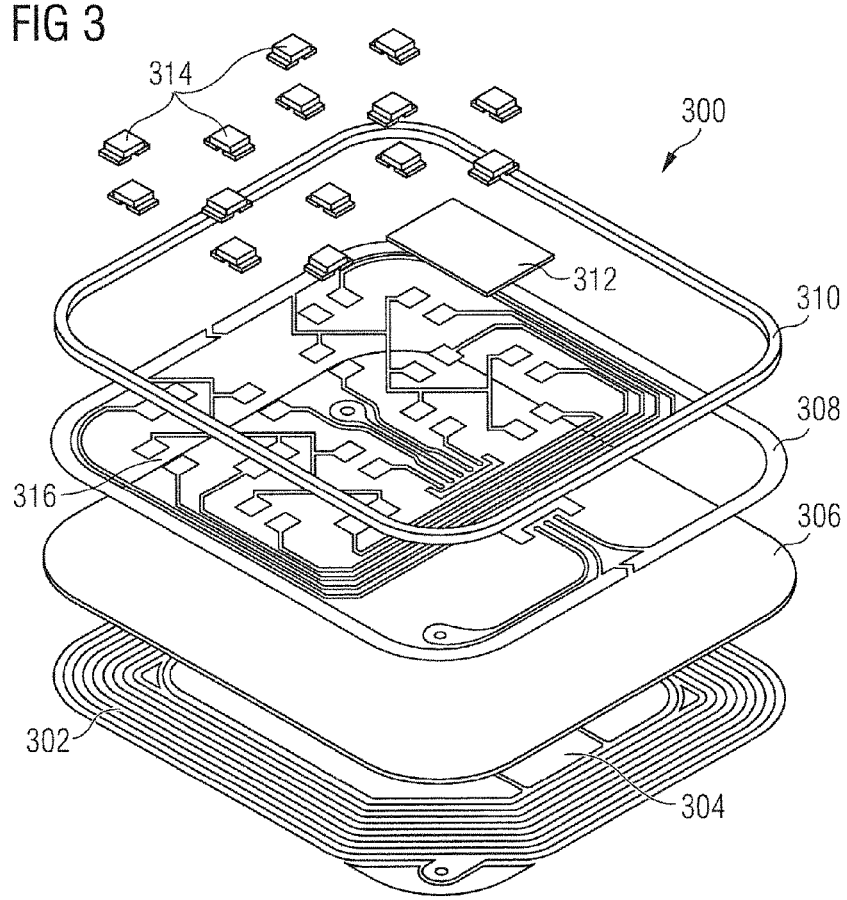
FIG. 3 shows one embodiment of the chip card module.

FIG. 3 illustrates a chip card module 300 in accordance with various embodiments in a perspective exploded illustration. The chip card module 300 in accordance with various embodiments can be constructed on a chip card module carrier 306 (also designated hereinafter as carrier), which can have a thickness in the range of approximately 25 μm to approximately 50 μm. The carrier 306 can have a rectangular shape having rounded edges. The carrier 306 can for example include epoxy resin, polyimide (PI), FR4 (glass fiber mat impregnated with epoxy resin), PET (polyethylene terephthalate), PC (polycarbonate), PVS (polyvinylsiloxane), PET (polyethylene terephthalate), PMMA (polymethyl methacrylate), ABS (acrylonitrile-butadiene-styrene) or PVC (polyvinyl chloride) or consist of one of these materials or a mixture thereof. Generally, customary materials used for the manufacture of chip card bodies can be used. The carrier 306, the basic area of which can define a basic area for the chip card module 300 in accordance with various embodiments, can have a dimensioning of 13 mm×11.8 mm, for example. However, any other dimensioning is also conceivable which can ultimately be adapted to the environment in which the chip card module 300 can be used, that is to say for example to the space available in an associated chip card.

The wiring structure 308 can be provided on a first surface of the chip card module carrier 306, for example on an upper surface of the chip card module carrier 306. The wiring structure 308 can for example be formed from a metallization layer and be designed for electrically connecting the components/structural parts of the chip card module 300 in accordance with various embodiments. The wiring structure 308, for instance conductor tracks and/or contact locations of the wiring structure, can have a thickness in the range of approximately 5 μm to approximately 30 μm and include an electrically conductive material, for example copper, a copper alloy and/or an iron-nickel alloy or else mixtures thereof. Although FIG. 3 illustrates the wiring structure 308 arranged only on the upper surface of the carrier 306, a part of the wiring structure 308 can also be formed on the other surface of the carrier 306, for example on the lower surface of the carrier 306. To put it another way, an upper part and a lower part of the wiring structure 308 can be provided, wherein these can be in electrical contact with one another by feedthroughs provided in the carrier.

The lower part of the wiring structure 308 can have an antenna 302, for example, which can be present in the form of conductor track turns running in an edge region of the basic area of the chip card module 300. The upper part of the wiring structure 308 can have contact locations 316, at which illuminants 314 can be positioned wherein the totality of the illuminants 314 form a light device. Each of the contact locations 316 can have a cathode terminal and an anode terminal, such that an illuminant 314 positioned at a contact location 316 can be supplied with current.

LEDs (light emitting diodes) or OLEDs (organic LEDs) can be used as illuminants 314. In the case where LEDs are used, these can be present as encapsulated (packaged) LEDs, for example as SMD devices (SMD: surface-mounted device). However, the LEDs can also be present as LED semiconductor chips that are electrically connected to the corresponding contact locations 316 by wire bonding. Furthermore, the LEDs can be fixed to the corresponding contact locations 316 by the flip-chip mounting technique. In this case, the illuminants 314 can be arranged in an expedient arrangement on a surface of the carrier 306, in this exemplary case on the upper surface of the carrier 306 (and on the metallization structure 308). In this case, the illuminants 314 can be mixed in any desired manner that is to say both LEDs and OLEDs can be used, wherein different fixing techniques can also be used at the same time (for example wire bonding and flip-chip mounting). By way of example, picoLEDs can be used as illuminants 314, these being particularly thin LED semiconductor chips (which are produced by Osram or Rohm, for example) having a device height in the range of approximately 180 μm to approximately 250 μm, for example 200 μm.

The illuminants 314 can be arranged for example in such a way that they form a display having two seven-segment displays. However, this is only one of many possible arrangement variations of the illuminants 314, wherein each of the latter can differ from the other illuminants 314 in terms of its color, brightness, dimensioning and further representation of relevant parameters. In any case, the illuminants 314 are connected to a chip 312 by the wiring structure 308, which chip can be arranged on the upper surface of the carrier 306 (and on the wiring structure 308). The chip 312 or alternatively a dedicated control unit for the lighting device can also be arranged on the other surface of the carrier 306. The lighting device can also be formed as a larger, continuous OLED surface, wherein different organic emitter layers can be contained within this surface, such that overall a color display can be formed.

The chip 312 can be an integrated circuit, which can be designed to perform corresponding chip card functions inter alia to drive the illuminants 314. By the wiring structure 308, the chip 312 can be electrically connected to further components/structural elements such as, for instance, coils, capacitors, memory blocks and/or further functional elements. The chip 312 can have for example a rectangular shape having a dimensioning of approximately 2.1 mm by 3 mm and a device height in a range of approximately 25 μm to approximately 100 μm, for example 50 μm.

In order to protect the chip 312 against an excessive mechanical stress, a reinforced region 304 can be provided on the upper surface of the carrier 306 and/or the lower surface of the carrier 306. The reinforced region 304 can be designed for example as a metal plate or as a layer composed of some other material approximately of the size of the basic area of the chip 312 or somewhat larger, wherein the reinforced region 304 can have a higher stiffness value than the elastic carrier 306. As a result, mechanical forces acting on the chip card module in the region of the chip 312 (if possible on the latter) can be transmitted by the reinforced region 304 to the surroundings thereof and the chip 312 can thereby be protected against damage such as perforation, for instance.

The chip card module 300 in accordance with various embodiments can furthermore include a ring 310 running on the carrier surface 306 along the edge of the basic area of the chip card module 300. To put it another way, the ring 310 can have, in principle, the shape of the contour line of the carrier 306. However, it can be made a little smaller, such that it can be arranged at a distance away from the edge of the carrier 306 on the latter. The wiring structure 308 and components/structural elements arranged thereon such as, for instance, the illuminants 314 and the chip 312 can be surrounded by the ring 310. The ring 310 can function as a stiffening structure and impart more stiffness to the chip card module 300 in accordance with various embodiments. In addition, the ring 310 can function as a potting ring if the inner region of the chip card module 300 above the wiring structure 308 is filled with a potting compound (not illustrated in FIG. 3) as covering material. The potting ring then prevents the potting compound from running. However, the covering material which covers the chip card module 300, for example the potting compound, need not necessarily be delimited by the ring 310. The ring 310 can also be used just temporarily during the production process, for example as a stencil, and can be removed again after the curing of the covering material.

The chip card module 300 in accordance with various embodiments as shown in the perspective exploded illustration in FIG. 3 can have a device thickness in a range of approximately 350 μm to approximately 450 μm.

Figure 4:
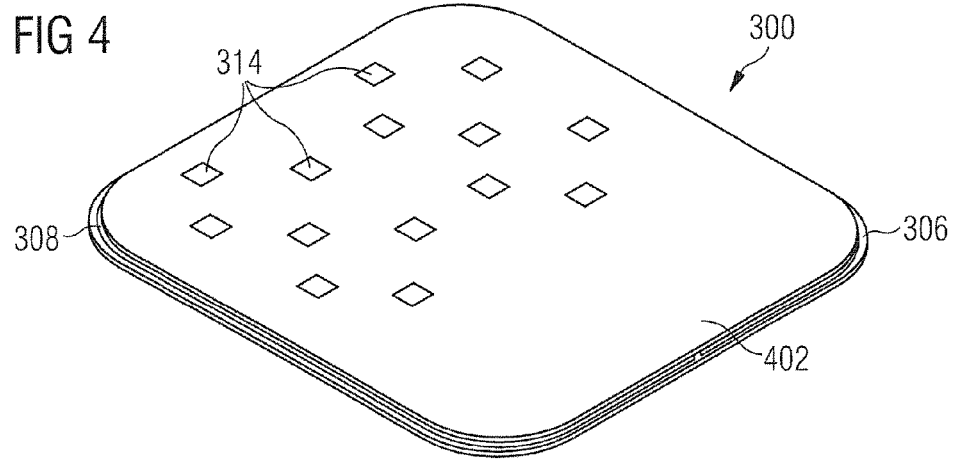
FIG. 4 shows a further embodiment of the chip card module.

FIG. 4 shows the chip card module 300 in accordance with various embodiments in an assembled form. In this illustration, a covering layer 402 is arranged on the wiring structure 308 arranged on the carrier 306 and the components/structural elements arranged on said wiring structure, such as, for instance, the illuminants 314 and the chip 312. Besides customary epoxy-resin-based materials for the covering layer the following materials are suitable since they are compatible with the chip card material: PET (polyethylene terephthalate), PC (polycarbonate), PVS (polyvinylsiloxane), PET (polyethylene terephthalate), PMMA (polymethyl methacrylate), ABS (acrylonitrile-butadiene-styrene), PVC (polyvinyl chloride) or TPU (thermoplastic polyurethane). Only the illuminants 314 are indicated in FIG. 4, however, for the sake of better clarity, said illuminants being situated below the covering layer 402. The covering layer 402 can be produced from a potting compound, for example, which, after the wiring structure 308 has been fitted with the corresponding devices/components, is poured over the latter. In this case, the ring 310 prevents the potting compound from running, such that said potting compound can solidify above the carrier 306 and can form a sealing layer. The illuminants 314 that are arranged together with the chip 312 on the upper surface of the carrier 306 and are covered by the covering layer 402 thus form an integral part of the chip card module 300 in accordance with various embodiments. Alternatively, the covering layer 402 may include a mold cap, which can be used instead of the potting compound for sealing the chip card module 300 in accordance with various embodiments. In this case, the ring 310 can be used in its function as a stiffening structure, but it can also be omitted since the mold cap is applied as a finished structure without a solidification phase, such that there is no need to counteract its flowing away.

The covering layer 402 additionally has the effect that it can cover all components/structural elements, on the carrier 306, for instance the chip 312 and the illuminants 314 on the wiring structure 308, and can form a smooth surface of the chip card module 300 in accordance with various embodiments which can negligibly enlarge the device thickness of the chip card module 300. The device thickness of the chip card module 300 can substantially be determined by the thickness of the carrier 306 and the device having the largest device thickness arranged on the carrier 306. The rear side of the carrier 306, on which, as is shown in FIG. 3, the antenna 302 and the reinforced region 304 can be arranged, can intrinsically have a substantially smooth surface or can, as necessary, likewise be covered with a covering layer, such that a planar surface can be formed. A smooth front and rear side of the chip card module 300 in accordance with various embodiments can simplify the lamination of the chip card module 300 in a chip card (in a chip card body) since no compensation layers need be applied above/below the chip card module, rather the chip card module can for example be inserted in a simple manner into a depression correspondingly provided therefor, for example a stamped-out portion, in a layer of the chip card body.

Independently of the type of covering layer 402, the latter is transparent to the light of the illuminants 314 at least in the region above the latter, such that the light generated by the illuminants 314 can pass through the covering layer 402 and can be emitted toward the outside. For this purpose, the material used as potting material for forming the covering layer 402 or the material of the mold cap can already be transparent to the light of the illuminants 314.

As already mentioned, LEDs and/or OLEDs can be used as illuminants 314. By virtue of the possibility of using thin LEDs as uncomplicated, insensitive standard components producible as mass-produced products, a manufacturer of the chip card module 300 in accordance with various embodiments can have recourse to a wide supplier base for this component. It should be pointed out again that although the lighting device shown in FIG. 3 and FIG. 4 includes individual discrete illuminants 314, arbitrary parts and/or additional parts of the lighting device can also be formed as planar lighting elements, for example on the basis of an OLED layer that can be formed as a monolayer or multilayer OLED. To put it another way, the manufacturer of the chip card module 300 in accordance with various embodiments can expediently adapt the type and arrangement of the lighting device, wherein the lighting device is always an integral part of the chip card module 300 (is cohesively connected thereto) and together with other components, such as, for instance, the chip 312 that can be arranged on the wiring structure 308, can be sealed toward the outside by the covering layer 402.

FIG. 5 shows a further chip card module 500 in accordance with various embodiments, which functionally can have the same construction as the chip card module shown in FIG. 3 or in FIG. 4. In contrast thereto, however, here a (multifunctional) carrier strip 506 serves as chip card module carrier for the chip card module 500 in accordance with various embodiments. The carrier strip 506 can already include a wiring structure 508 formed thereon together with illuminants 514 and need only be fitted with the chip 512, for example. To put it another way, the lighting device in the form of illuminants 514 can be regarded as an already present integral part of the carrier strip 506. All further components and/or production steps such as, for instance, the ring 310 and/or the deposition of the potting compound above the carrier strip 506 or, as an alternative thereto, the arrangement of the mold cap above the carrier strip 506 can correspond to those which have been described/shown in association with FIG. 3.

In general, the carrier strip 506 can be an electrically insulating, flexible substrate, which for example may include polyimide (PI), FR4 (glass fiber mat impregnated with epoxy resin), BT-epoxy or some other materials usually used for the manufacture of chip card bodies or can consist of a mixture of these materials. The carrier strip 506 has the connection structure 508 already fixedly connected thereto, for example in the form of conductor tracks that can be provided on the carrier substrate by electroplating, for example. The connection structure 508 can be formed both on the front side of the carrier strip 506 (as can be seen in FIG. 5) and additionally on the rear side of the carrier strip 506. The lighting device, that is to say the illuminants 314, 514 shown in FIG. 3 to FIG. 5, can already be formed on the carrier strip 506, for example as singulated LEDs and/or OLEDs. However, the lighting device can also include a planar OLED display formed on the carrier strip 506. To put it generally, however, the carrier strip 506 can be manufactured with combined use of different production technologies (e.g. OLED and electroplating). In addition to the elements just described, various further electronic components such as, for instance, coils, capacitors, memory components can also be formed on the carrier strip 506, and also the chip card module antenna, which can be formed for example on the rear side of the carrier strip 506 (not illustrated in FIG. 5).

With the use of the (multifunctional) carrier strip 506, the number of interconnects can be reduced compared with the use of a corresponding chip card module carrier which is fitted with singulated illuminants (for example individual LEDs or OLEDs). This can have the effect that potential failure sites can be avoided. In addition, the variant of a chip card module as shown in FIG. 5 enables a thinner module construction which can be in the region of approximately 200 µm, for example. As a result, it is possible to produce a chip card module with a higher flexibility, which ultimately makes it possible to realize more flexible multilayer constructions in the case of chip cards.

FIG. 6 illustrates one embodiment of an illuminant 600. The illuminant 600 illustrated can correspond to at least one of the illuminants 514 shown in FIG. 5 and can thus be arranged at one of the contact locations within the wiring structure 508. The exemplary illuminant 600 illustrated in FIG. 6 is an OLED having a light emitting layer 606 arranged between a first electrode 604 and a second electrode 602. In this case, the second electrode 602 can be transparent to the light emitted by the light emitting layer 606. The illuminant 600 illustrated in FIG. 6 can additionally be surrounded by a sealing layer. However, the sealing layer can also be omitted and its function can be performed by the covering layer shown in FIG. 3 and in FIG. 4.

Figure 7:
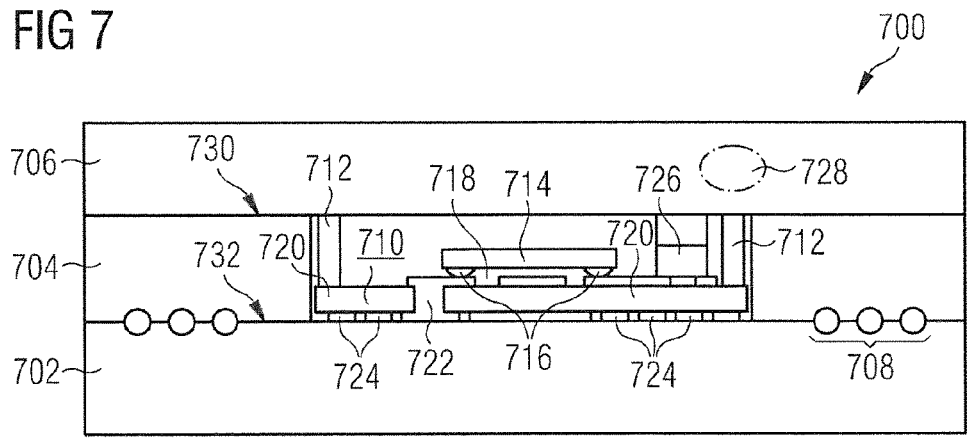
FIG. 7 shows an exemplary construction of a chip card in which the chip card module in accordance with various embodiments is integrated.

FIG. 7 illustrates an exemplary construction of a chip card 700 in which a chip card module in accordance with various embodiments is implemented. It should be noted here that the proportions of the individual parts/components with respect to one another in FIG. 7 are not to be understood as an indication of actual dimensions of parts/components and the proportions thereof with respect to one another in actual chip cards.

The exemplary chip card 700 illustrated in FIG. 7 may include three layers: a first layer 702, a second layer 704, and a third layer 706. Here each of the three layers just mentioned can in each case be representative of a plurality of layers. The bottommost ply or layer of the first layer 702 can constitute an underside of the chip card 700, and the topmost ply or layer of the third layer 706 can constitute a top side of the chip card 700. The top side and the underside of the chip card 700 are taken to mean in each case the surfaces that the user touches when handling the chip card. The second layer 704 can represent the functional layers of a chip card, wherein here only one second layer 704 is described as a functional layer for illustration purposes. Modern chip cards nowadays can have an arrangement of, for instance, ten, twelve or more layers one above another.

The second layer 704 can be, for example, a layer composed of PVC, ABS, polyester or polycarbonate, for instance, which has a basic area, corresponding to the basic area of the chip card 700 in accordance with various embodiments. In the second layer 704, a region can be exposed in which a chip card module can be inserted, for example the chip card module in accordance with various embodiments as shown in FIG. 3 to FIG. 5. To put it another way, the second layer 704 can function as a carrier matrix in which the chip card module can be embedded.

In accordance with the explanations concerning FIG. 3 to FIG. 5, the chip card module in accordance with various embodiments can be constructed on a carrier 720 (or a carrier strip), on which the wiring structure can be arranged. The wiring structure can be arranged on a top side and an underside of the carrier 720, wherein the two wiring structure regions can be electrically connected to one another by a plated-through hole 722. On one side of the carrier 720, for example on the top side thereof, the chip 714 and the illuminants 726 can be arranged and be in electrical contact with one another by the wiring structure. In this case, the chip 714 can be in electrical contact with the wiring structure by stud bumps, which may include gold or nickel-gold, for example. The region under and/or around the chip 714 can be filled with an underfill and mechanically connect the chip 714 to the carrier 720 (or the carrier strip). Shrinkage of the underfill during the process for producing the chip card module can have the effect that the stud bumps are pressed onto the contact areas. The chip card module antenna 724 can be arranged on the other side of the carrier 720, for example on the underside thereof. The ring 712 can be arranged along the edge of the carrier 720. The residual volume 710 above the top side 720 of the carrier 720 which is surrounded by the ring 720 can be filled with a potting compound or alternatively by the mold cap. In this case, the surface of the potting compound or of the mold cup can terminate flush with the upper surface 730 of the second layer 704, such that the second layer 704 overall has a smooth upper surface 730.

A chip card antenna 708 can be formed at the lower surface 732 of the second layer 704. The chip card antenna 708 can be present in the form of conductor track turns which, as viewed from the center of the chip card module in a radial direction toward the edges of the chip card 700, run substantially outside the region of the chip card module around the latter. In this case, the edges of the chip card 700 in accordance with various embodiments should be understood to be the edges of the chip card 700 which are formed jointly by the edges of the first layer 702, of the second layer 704 and of the third layer 706. The chip card antenna 708 can alternatively also be formed at the upper surface 730 of the second layer 704 or alternatively within an arbitrary layer or between two arbitrary layers within the chip card 700. To put it another way, the vertical position of the plane in which the chip card antenna 708 is arranged is arbitrary, such that further chip card layers can be arranged between the chip card layer which has the chip card module (the second layer 704 in this example) and the chip card antenna 708. During the operation of the chip card 700 in a magnetic field of a reader, the chip card module antenna 724 couples inductively to the chip card antenna 708, which performs the function of a booster antenna. In this case, by the booster antenna and the chip card module antenna 724, energy from the magnetic field of the reader can be provided to the chip card module, such that the chip 714 can be operated and the illuminants 726 can be operated as necessary.

A region 728 in the third layer 706 of the exemplary chip card 700 is configured such that it is transparent to the light of the illuminant 726. In this case, the region 728 may include at least one region within the third layer 706 between the upper surface 730 of the second layer 704 and the upper layer of the third layer 706 above the at least one illuminant 726. To put it another way, the third layer 706 is formed in such a way that it transmits the light generated by the at least one illuminant 726 and allows it to penetrate through to the surface, for instance the upper surface of the third layer 706, of the exemplary chip card 700. Consequently, the lighting device can be utilized as a display, for example, which is situated in the interior of the chip card 700 in accordance with various embodiments, but its light is visible externally through the third layer 706.

Figure 8:
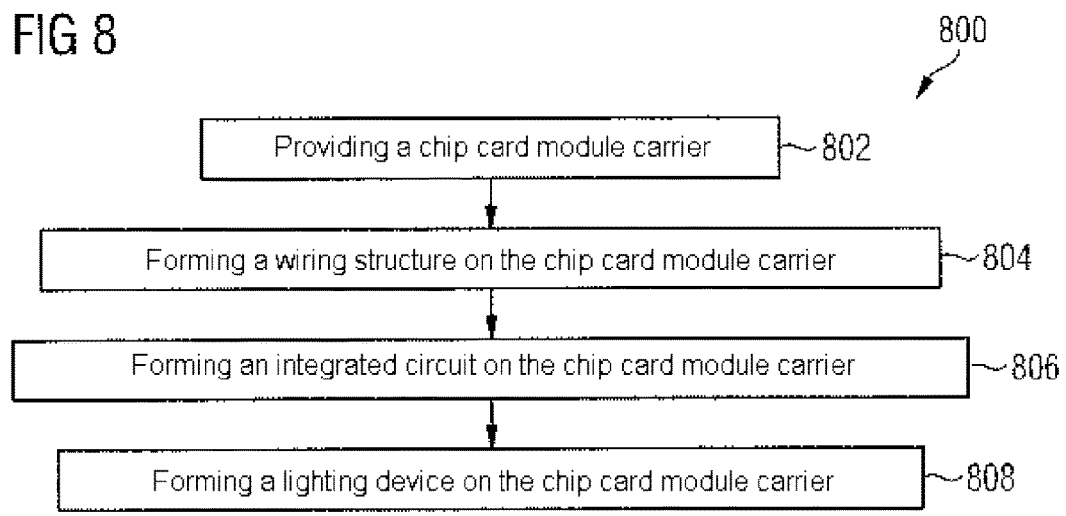
FIG. 8 shows a method for producing the chip card module in accordance with various embodiments.

FIG. 8 illustrates a method 800 for producing a chip card module in accordance with various embodiments. In a first step 802 of the method 800, the latter may include providing a chip card module carrier. In a second step 804, the method 800 may include forming a wiring structure on the chip card module carrier. In a third step 806, the method 800 may include forming an integrated circuit on the chip card module carrier, wherein the circuit is electrically coupled to the wiring structure. In a fifth step 808, the method 800 may include forming a lighting device on the chip card module carrier, said lighting device likewise being electrically coupled to the wiring structure.

Figure 9:
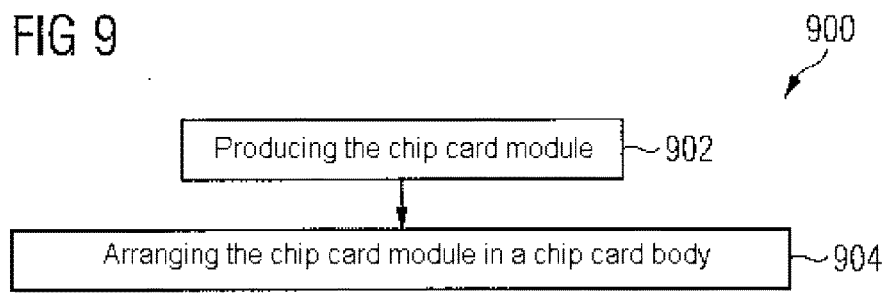
FIG. 9 shows a method for producing a chip card including the chip card module in accordance with various embodiments.

FIG. 9 illustrates a method 900 for producing a chip card which includes the chip card module in accordance with various embodiments. The method 900 can firstly include a first step 902 of producing a chip card module in accordance with various embodiments. The method 900 can furthermore include, in a further step 904, arranging the chip card module in a chip card body, such that the chip card module in accordance with various embodiments is completely surrounded by the chip card body.

Figure 10:
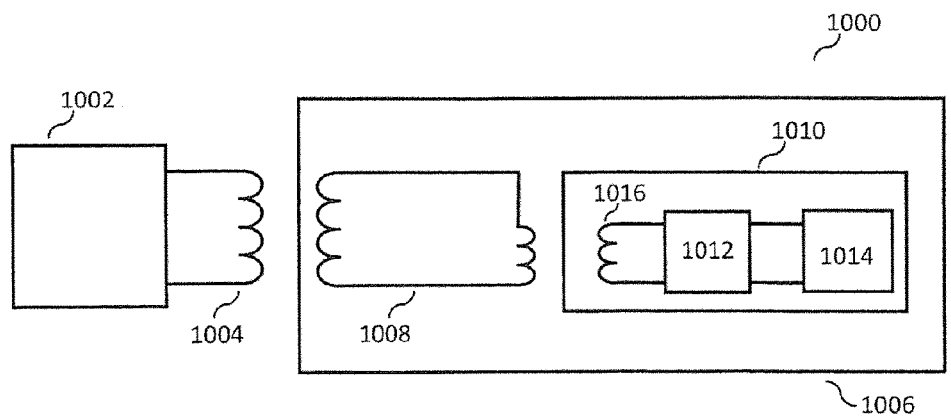
FIG. 10 shows an overall system including a chip card in accordance with various embodiments and a reading unit.

FIG. 10 illustrates an overall system 1000, including a reading unit 1002 and a valuable and/or security document in the form of a chip card 1006. The overall system can be designed to communicate for example in accordance with the NFC standard. Within the ISO/IEC 14443 standard, the reading unit 1002 is designated as PCD (proximity coupling device) and the chip card 1006 is designated as PICC (proximity integrated circuit card). The reading unit 1002 may include a reading unit antenna 1004 in order to be able to exchange data with the chip card 1006 contactlessly. The chip card 1006 includes a display module 1010 and a booster antenna 1008. For its part, the display module 1010 includes a display module antenna 1016, which is coupled to a circuit 1012, for example an integrated circuit, for example a chip 1012, such as a silicon chip, for instance. The chip 1012 is electrically coupled to a lighting device 1014 arranged in the display module 1010, which lighting device may include for example LEDs or OLEDs as discrete illuminants. The communication between the display module 1010 and the reading unit 1002 is carried out by the booster antenna 1008, which fulfills the function of a communicating amplifier antenna. In this exemplary overall system 1000, both the coupling between the booster antenna 1008 and the reading unit 1002 and the coupling between the booster antenna 1008 and the display module 1010 take place inductively, i.e. without corresponding susceptible contact locations (contact-connections) being required. The chip card 1006 in accordance with various embodiments is designed in such a way that the light generated by the display module 1010 can be emitted from the chip card 1006 toward the outside. In this case, the wavelength of the light emitted directly by the display module 1010 can differ from the wavelength of the light which passes through the outermost layer of the chip card 1006 and is emitted toward the outside, where it can be perceived by a user of the chip card 1006, for example. A conversion layer can be arranged between the lighting device 1014 of the display module 1010 and the outermost layer of the chip card 1006, which conversion layer can be designed for converting the light emitted directly by the lighting device 1040. To put it another way, the wavelength of the light which a user of the chip card 1006 perceives as emanating from the chip card 1006 can differ from the wavelength of the light which is emitted by the lighting device 1014 of the display module 1010. The conversion region can be a region which is designed for the frequency conversion of the light emitted by the lighting device 1014. In this case, the radiation emitted by the lighting device 1014 can be increased or decreased by the conversion region. The conversion region can be for example a region which includes a fluorescent and/or phosphorescent material. Furthermore, the lighting device 1014 in accordance with various embodiments can be designed for emitting non-cognitively detectable signals, such as, for instance, for the emission of a pulsed light and/or for the representation of a segment bar code. The more detailed configuration of the conversion region is described in subsequent figures.

Figure 11:
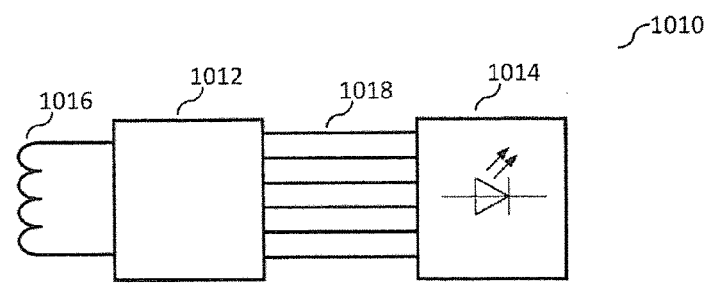
FIG. 11 shows a display module in accordance with various embodiments.

FIG. 11 illustrates one possible embodiment of the display module 1010 from FIG. 10. The lighting device 1014 is electrically connected to the chip 1012 by a wiring 1018. The chip 1012 is electrically coupled to the display module antenna 1016, which can be the chip card module antenna. As illustrated in FIG. 11, the lighting device 1014 can be directly connected to the chip 1012, i.e. for example without an interposed driver circuit. In other words, a single-chip solution requiring only one integrated circuit can thus be provided.

Figure 12:
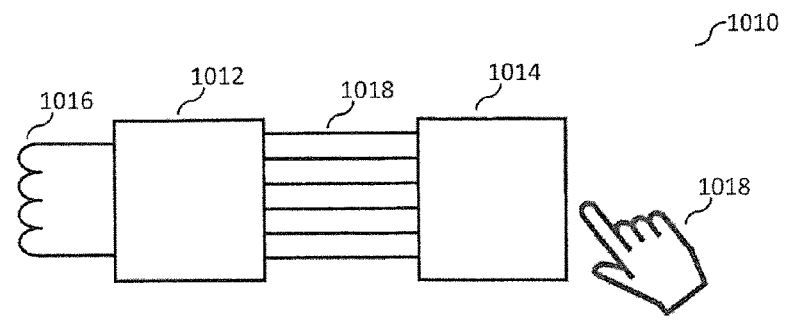
FIG. 12 shows a further display module in accordance with various embodiments.

FIG. 12 illustrates a further embodiment of the display module 1010. The display module shown in FIG. 12 has the same structural construction as the display module shown in FIG. 11, such that the same reference signs are used for the functionally identical components. In contrast to the display module 1010 shown in FIG. 11, however, the display module 1010 shown in FIG. 12 includes a lighting device 1014 that is simultaneously designed as a touch-sensitive sensor. To put it another way, in this embodiment, the lighting device 1014 can be used both for displaying information and for use as a wear-free input element. For use as input element, it is possible to use for example the inherent capacitance of the LEDs arranged in the lighting device 1014. In this case, the corresponding LED can be driven and its discharge behavior can be evaluated. The discharge duration is influenced if the corresponding LED is darkened, e.g. if a user brings his/her finger in direct proximity to the illuminants, for example against the surface of the chip card. This input element can be used for confirmations, inputs of information or for activating the security document.

The chip 1012 can be, for example, a security chip with an internal controller having cryptographic functionalities. The chip 1012 can furthermore be designed for power management and include GPIOs (General Purpose Input/Output—general contact pin on an integrated circuit) for driving the discrete illuminants of the lighting device 1014, for example the individual LEDs or OLEDs.

In order to increase the number of illuminants within the lighting device 1014, a multiplex method can be used for the driving thereof. By virtue of their specific arrangement within the display module 1010, the individual illuminants can be used for forming numeric or alphanumeric displays and thus for displaying numbers and/or characters. This aspect is explained in greater detail in the subsequent figures. In a further embodiment (not illustrated) of the display module 1010, the illuminants arranged thereon can be connected directly to the display module antenna 1016 and not to corresponding terminals on the chip 1012. As a result, the lighting device 1014 can constitute an optical field display for a user. This can serve as a status display and for example indicate that a wireless data communication between the chip card 1006 and the reading unit 1002 is currently taking place, or can give an indication of the signal strength of the reading unit.

Figure 13:
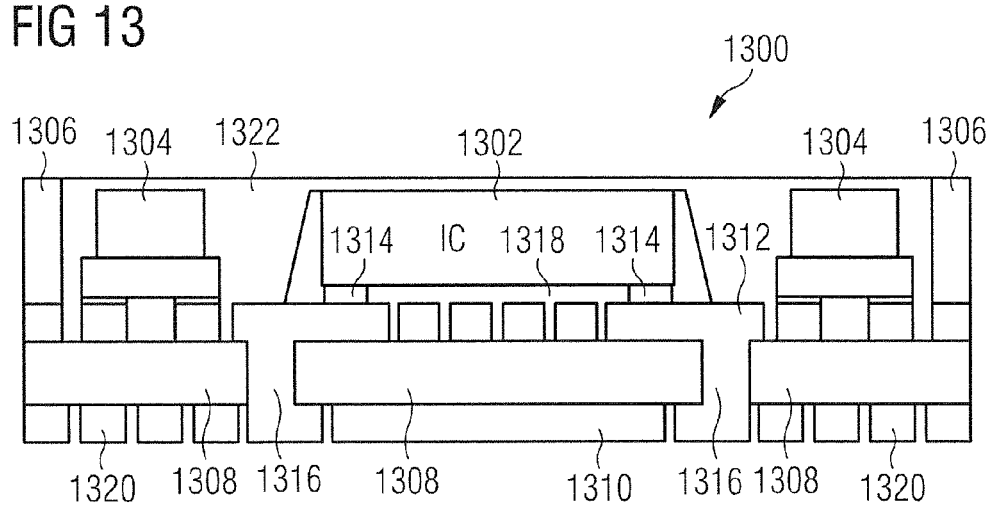
FIG. 13 shows a schematic cross-sectional view of a display module in accordance with various embodiments.

FIG. 13 illustrates a schematic cross section through a display module 1300 in accordance with various embodiments. The cross section shown in FIG. 13 is similar to the construction of a chip card module likewise illustrated in cross section in FIG. 7 in the second layer 704. The proportions of the individual parts/components with respect to one another in FIG. 13 are not necessarily intended to be understood as an indication of actual dimensions of parts/components and the proportions thereof with respect to one another in the case of actual chip cards. The display module 1300 illustrated in FIG. 13 can be arranged in a layer within an arrangement of layers in a chip card, as is the case for example in FIG. 7 or FIGS. 14A, 14B.

The display module 1300 can be constructed on a carrier (or carrier strip) 1308, which for example may include epoxy resin, polyimide (PI), FR4 (glass fiber mat impregnated with epoxy resin), PET (polyethylene terephthalate), PC (polycarbonate), PVS (polyvinylsiloxane), PET (polyethylene terephthalate), PMMA (polymethyl methacrylate), ABS (acrylonitrile-butadiene-styrene) or PVC (polyvinyl chloride) or consist of one of these materials or a mixture thereof. A wiring structure 1312 is arranged on the carrier 1308, which wiring structure can be formed on a top side and/or on an underside of the carrier 1308, wherein the two wiring structure parts can then be electrically connected to one another by plated-through holes 1316. On one side of the carrier 1308, for example on the top side thereof, the chip 1302 and the illuminants 1304 that form the lighting device can be arranged and electrically coupled to the chip 1302 by the wiring structure 1312. In this case, the chip 1302 can be in electrical contact with the wiring structure 1312 by stud bumps 1314, which may include gold or nickel-gold, for example. The region under and/or around the chip 1302 can be filled with an underfill 1318 and mechanically connect the chip 1302 to the carrier 1308 (or the carrier strip). Shrinkage of the underfill 1318 during the process for producing the display module 1300 can have the effect that the stud bumps 1314 are pressed onto the contact areas. The display module antenna 1320 can be arranged on the other side of the carrier 1308, for example on the underside thereof. The display module antenna 1320 can have at least one turn which is arranged along the edge of the display module 1300. The ring 1306 can be arranged along the edge of the carrier 1308 on the top side thereof, which ring has already been described with regard to the embodiment of the chip card module as illustrated in FIG. 7. The free volume 1322 above the top side of the carrier 1308 which is delimited by the ring 1306 can be filled with a potting compound or an encapsulation material. The encapsulation material can generally be a polymer, for example epoxy (for example UV-curing epoxy or 2C epoxy), PET (polyethylene terephthalate), PC (polycarbonate), PVS (polyvinylsiloxane), PET (polyethylene terephthalate), PMMA (polymethyl methacrylate), PVC (polyvinyl chloride) or TPU (thermoplastic polyurethane). At the underside of the carrier 1308, in the region above which the chip 1302 is arranged, a reinforced region 1310 can be present, for example in the form of a lamina composed of a hard or stiff material (for example metal) which can impart to the carrier 1308 in the region of the chip 1302 more stability with regard to possible flexures.

Figure 14A:
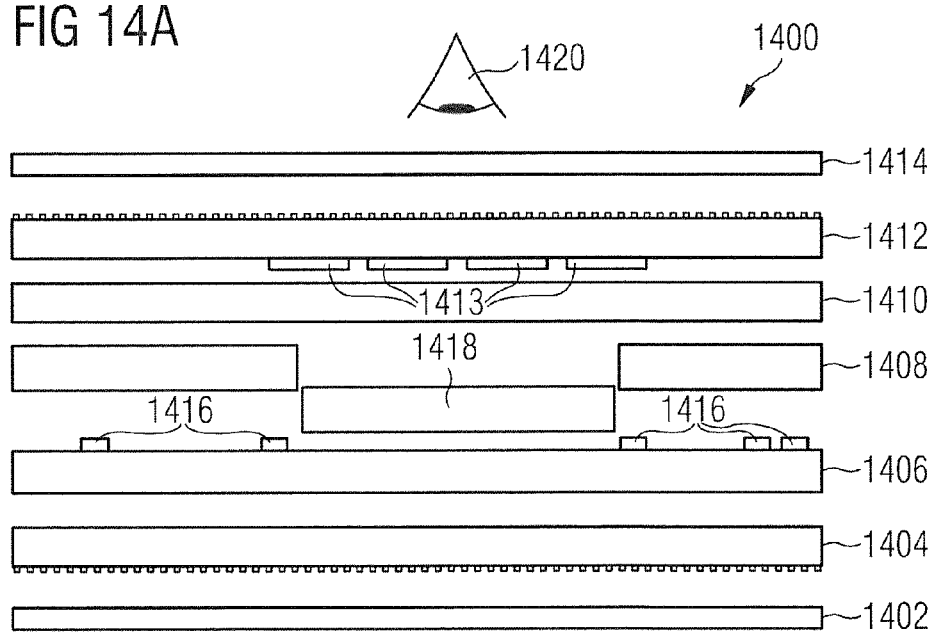
FIGS. 14A and 14B in each case show a schematic view of a chip card in accordance with various embodiments in a cross-sectional view.

FIG. 14A illustrates a schematic construction of a chip card 1400 in accordance with various embodiments in cross section. The sequence of the layers within the chip card 1400 in accordance with various embodiments is described below, starting from the bottommost layer illustrated in FIG. 14A.

The first layer 1402 can be a material layer which a surface of the chip card 1400 formed, for example the underside of the chip card 1400, with which a user can make haptic contact. A second layer 1404, which may include a printed sheet, can be arranged on the first layer 1402. The printed sheet is a printed film having the graphical layout of the chip card.

A third layer 1406 can be arranged on the second layer 1404 and can serve as a carrier layer for conductor tracks 1416. The display module 1418 can be arranged on this layer. A compensation film 1408 can be arranged around the display module 1418. The top side of the compensation film 1408 can terminate flush with the top side of the display module 1418, such that overall the display module 1418 and the compensation film 1408 form a fourth layer having a planar upper surface. A fifth layer 1410 is arranged on this planar surface and may include a diffuser, that is to say a diffusely scattering medium, for instance a diffuser film. A sixth layer 1412 can be arranged on the diffuser film and may include a printed sheet with an inner mask 1413. In this context, inner means that the mask 1413 is arranged on that side of the sixth layer 1412 which faces the display module 1418. Finally, a seventh layer 1414 can be arranged on the sixth layer 1412 analogously to the first layer 1402, which seventh layer a further surface of the chip card 1400 formed, for example the top side of the chip card 1400.

It is pointed out that the designations top side of the chip card 1400 and underside of the chip card 1400 have been chosen arbitrarily. Hereinafter, the top side of the chip card 1400 refers to the side toward which light is emitted from the lighting device arranged on the display module 1418. In FIG. 14A, the observer 1420 looking at the top side of the chip card 1400 is symbolized here by the eye symbol. It should be emphasized at this juncture that the layer construction described in FIG. 14A is by way of example, such that as necessary further functional layers can be added or the number of layers illustrated in FIG. 14A can be reduced. The usable chip card 1400 is formed by the individual layers being laminated one on top of another.

The fifth layer 1410 including the diffuser has the task of bringing about diffuse scattering of the light emitted by the lighting device of the display module 1418. In other words, the diffuser film situated in the interior of the chip card 1400 above the display module 1418 serves for expanding the light emitted in a punctiform fashion by lighting elements of the lighting device in the display module 1418. The mask arranged above the diffuser film on that side of the sixth layer 1412 which faces toward the inner side of the chip card 1400 defines light-transmissive regions through which the expanded light can pass to the top side of the chip card 1400 and thus to the observer 1420. By the masking layer, i.e. by the mask 1413 arranged on the sixth layer 1412, the segments of a 7-segment display can be formed, for example. In this case, the mask 1413 can be printed on that side of the sixth layer 1412 which faces toward the interior of the chip card 1400, using black ink or some other light-nontransmissive material.

The joint use of the diffuser together with the mask 1413 makes it possible for the very bright, but practically punctiform light of the illuminants of the lighting device firstly to be converted into a larger luminous areas. Afterward, the expanded light propagates to the mask 1413, which transmits the diffuse light only at specific locations to the top side of the chip card 1400. A direct arrangement of the illuminants to form a segment display can have the consequence that the displayed luminous signal is scarcely perceptible to the observer 1420 since the punctiform light of the illuminants of the lighting device is not perceived as a common character. The illuminants used in the form of LEDs or OLEDs usually have a very small structural size since, for example, a chip card in the ID-1 format is permitted to have a maximum thickness of 800 µm. If the further layers are taken into account, then it may be necessary that the fourth layer including the display module 1418 should not exceed a thickness of approximately 200 µm, such that rather small illuminants are employed. By virtue of the diffuser, the punctiform illuminants are converted into planar light sources, the light of which can then be brought to the customary bar shape of a segment display by the mask, for example. To put it another way, in the plane of the diffuser every virtually punctiform light spot of an associated illuminant arranged in the lighting device 1014 is transformed to a larger luminous area by diffuse scattering. In this regard, the display can also be perceived as a segment display by the user 1420. The degree of diffuse scattering, i.e. the degree of expansion of the punctiform light, can be controlled by the concentration and type of the diffuser used. The more often and the greater the extent to which the light emitted by the illuminants of the lighting device 1014 is scattered on the way to the mask 1413, the greater the degree of expansion of the punctiform light.

In one modification of the embodiment of the chip card 1400 in accordance with various embodiments as illustrated in FIG. 14A, the diffuser can also be introduced into the potting material (encapsulation material) of the display module 1418. In other words, a material that scatters light diffusely, for example in the form of particles that scatter light diffusely, can be present in the potting material of the display module 1300. In such an embodiment, the fifth layer 1410 can then be omitted in the construction of the chip card 1400.

Figure 14B:
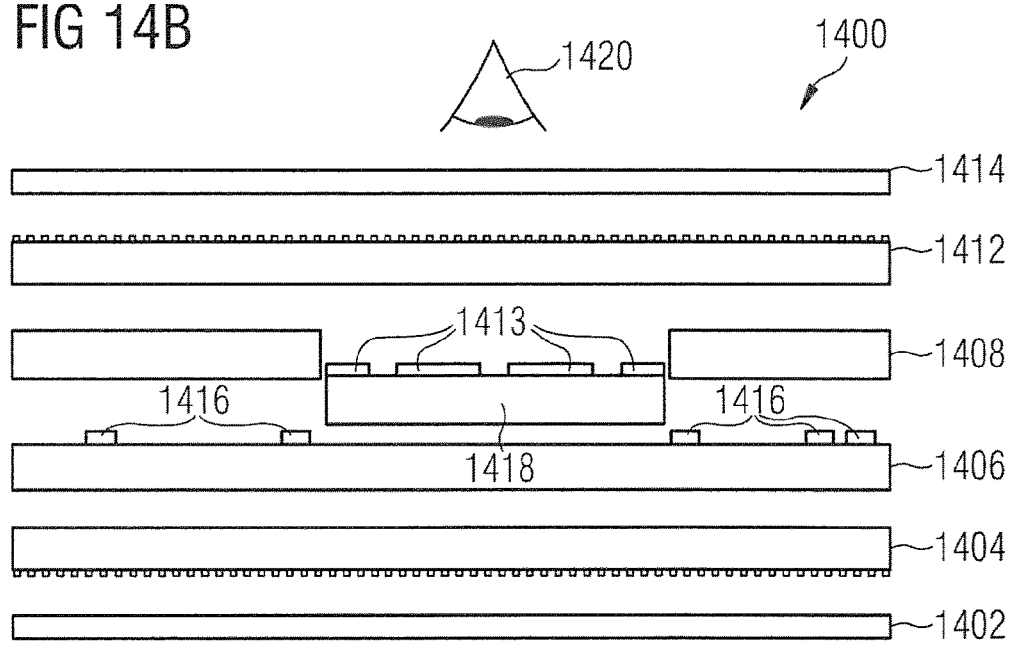

FIG. 14B illustrates a schematic construction of a chip card 1400 in accordance with further embodiments in cross section. The construction illustrated is very similar to the construction illustrated in FIG. 14A, such that identical reference signs designate identical elements and will not be described again. The difference with respect to the embodiment of the chip card 1400 illustrated in FIG. 14A is that the mask 1413 in FIG. 14B is not arranged on the sixth layer 1412, but rather is fitted directly on the display module 1418. In a production method, the mask 1413 can be printed for example onto the top side of the display module 1418. A further difference is that the diffuser is not provided in the form of a diffuser film (fifth layer 1410 in FIG. 14A), rather a material that scatters light diffusely or a transparent material including scattering particles, for example glass beads, is provided directly in the potting material of the display module 1418.

In association with the embodiments of the chip card 1400 which are shown in FIG. 14A and FIG. 14B, it should be mentioned that a complex transparent window in the construction of the chip card 1400 can be dispensed with on account of the brightness of the illuminants of the lighting device (for example LEDs or OLEDs). The layers or films (together with the layer forming the tangible surface of the chip card 1400, in this case the seventh layer 1417) arranged between the display module 1418 and the top side of the chip card 1400 can therefore be transparent and also translucent or correspondingly opaque. Consequently, the lighting device in the interior of the chip card 1400 is visible, without the need for a complex window technology to be used.

In association with the embodiments of the chip card in FIGS. 14A and 14B, it should be mentioned that the schematic construction of a chip card is illustrative. As usual in card production, in order to produce a chip card all films can be subjected to temperature and pressure in a heating/cooling press. In the course of this lamination, the individual films merge to form a composite. Particularly for a security document, the aim pursued is that of obtaining an inseparable monolithic block. Example materials are PET (polyethylene terephthalate), PC (polycarbonate), PVS (polyvinylsiloxane), PET (polyethylene terephthalate), PMMA (polymethyl methacrylate), ABS (acrylonitrile-butadiene-styrene) or PVC (polyvinyl chloride).

Figure 15:
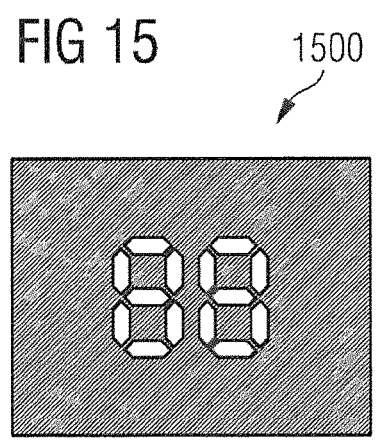
FIG. 15 shows one possible configuration of a mask layer of the display module in accordance with various embodiments.

FIG. 15 illustrates a plan view 1500 of a mask 1413. In this case, the covering layer 1413 is formed such that a 7-segment display is formed, by which two digits can be represented in this embodiment. In this case, the bright regions correspond to free regions in the mask layer 1413, i.e. regions which transmit light from the display module 1418 to the top side of the chip card 1400 toward the observer 1420. An illuminant can be arranged centrally behind each bar of a character in the 7-segment display, the light from which illuminant can be expanded by the diffuser uniformly to an area corresponding at least to the area of the bar, such that the latter can be illuminated uniformly as necessary. Depending on the size and brightness of the illuminants used, it is also possible for more than one illuminant to be used per bar, i.e. to be arranged behind the latter. Furthermore, illuminants which emit light of different colors can also be used in any desired combination.

Figure 16:
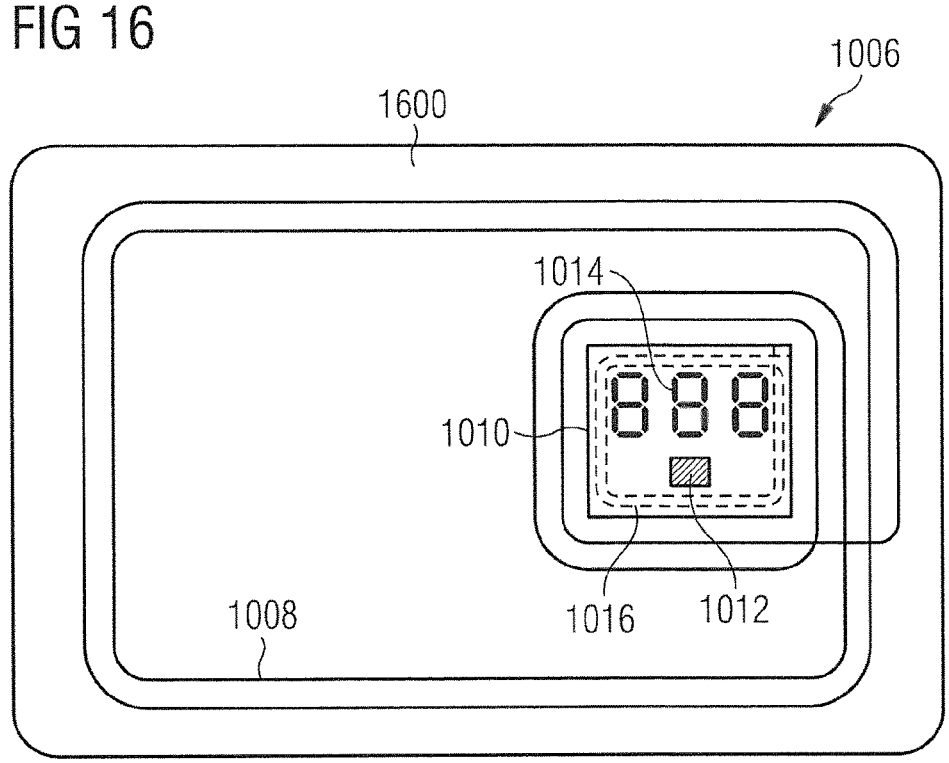
FIG. 16 shows a further embodiment of the chip card.

FIG. 16 illustrates a plan view of a chip card 1006 in accordance with various embodiments. The chip card 1600 includes components which have already been explained in association with FIGS. 10 to 12, such that identical components bear identical reference signs. The chip card 1006, which can be an arbitrary valuable and/or security document, includes a chip card body 1600. The booster antenna 1008 is arranged in the chip card body 1600. The booster antenna 1008 has a coupling region, in which the display module 1010 (chip card module) is arranged. The coupling region is formed by the conductor track turns of the booster antenna 1008, which in this embodiment surround from all four sides of the display module 1010. A display module antenna 1016 is provided on the display module 1010, which display module antenna can couple to the booster antenna 1008 inductively and thus in a manner free of wear. Therefore, there are no ohmic, wear-susceptible contacts between the display module 1010 and the booster antenna 1008, which contacts would otherwise have to be formed in a complex contacting process during the production of a customary chip card module. The chip 1012 is arranged on the display module 1010 and designed, inter alia, for driving the lighting device 1014. In this embodiment, the lighting device 1014 includes illuminants, for example LEDs or OLEDs, which are arranged in such a way that they form a 7-segment display having three digits.

Figure 17:
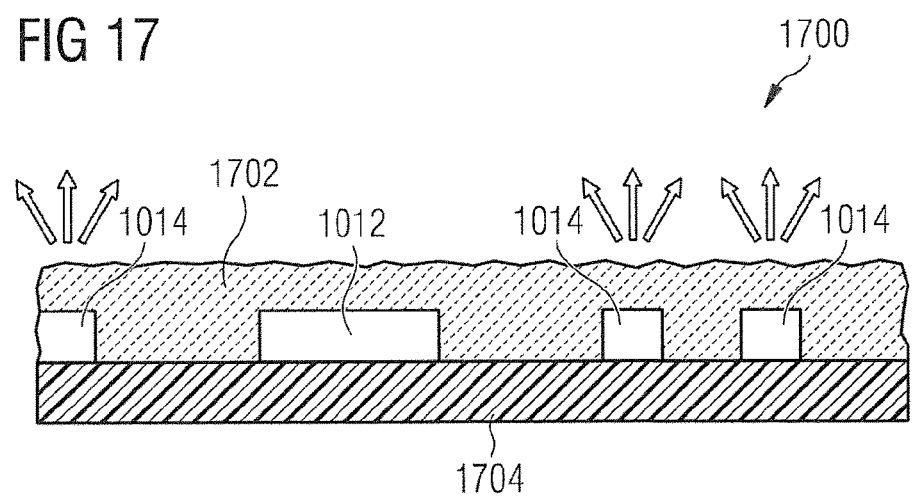
FIG. 17 shows an embodiment of the display module with security materials arranged therein.

FIG. 17 illustrates a display module 1010 in accordance with various embodiments in a cross-sectional view. The display module 1010 includes a carrier layer 1704, on which the chip 1012 and the lighting device 1014 are provided. In this embodiment, the lighting device 1014 includes discrete illuminants, for example LEDs or OLEDs. An encapsulation material 1702 is deposited above the carrier layer 1704, which encapsulation material fills the free regions between the chip 1012 and the lighting device 1014 and forms a planar surface above the carrier layer 1704. In this embodiment of the display module 1010, the encapsulation material 1702 includes at least one security material. A security material can change the properties of the light emitted by the lighting device 1014, for example the spectrum, response time and/or decay behavior of said light. For this purpose, the following security materials, for example, can be provided in the encapsulation material 1702: fluorescent or phosphorescent substances, dyes for filtering the emitted light, conversion phosphors (e.g. upconversion (light frequency upconversion) or downconversion (light frequency upconversion)) for shifting the emission spectrum of the emitted light, effect pigments. By virtue of the security material, further information features can be impressed on the light emitted by the lighting device 1014, which information features can be measured/evaluated as "$2^{nd}$-level feature" (second-level features) or "$3^{rd}$-level feature" (third-level features) by verification devices, for example correspondingly designed readers, in order the authenticity of the associated chip card 1006 in accordance with various The security material can also be utilized, with the use of commercially available LED components and/or OLED components as illuminants of the lighting device 1014, for incorporating a security feature in order to prevent exchange for other illuminants that are driven via a different, for instance, corrupted chip (instead of the authentic chip 1012).

With regard to the embodiments of the chip card 1400 in accordance with various embodiments as illustrated in FIGS. 14A and 14B, it should be added that the security material can also be contained in the fifth layer 1410 instead of in the encapsulation material of the chip card module 1418, said fifth layer including the diffuser. Furthermore, a spatial variation of the security material can also be utilized in order to bring about a spatially variable imprint of security features, such that, for instance, a specific proportion of the light emerging from the chip card 1006 has a downconverted wavelength and a further specific proportion of the light emerging from the chip card 1006 has an upconverted wavelength and the interrogation of the security feature by a correspondingly designed reader is successful only if the color mixing thus generated has a specific color.

With the display module in accordance with various embodiments, it is possible to realize diverse applications, some of which will be indicated by way of example below. In this regard, the display module can function as a status display, for example as a field display which can signal to a user if a reading process is being carried out and/or if a reading process has been concluded. This option can be used for instance in travel documents as user aid for self-service terminals, as dynamic PIN display, for representing a one-time password or a credit. However, the display module can also be used for optically transmitting data to a verification device, for example to a mobile terminal (e.g. smartphone). The data can be transmitted by non-cognitively detectable information, for instance as a segment bar code or in the form of light pulses. The data (e.g. visa information, passwords) communicated in this way can be decrypted and represented in the terminal (e.g. by a corresponding app). The display module in accordance with various embodiments can generally be employed in identification documents (ID documents) of all kinds, for example in a passport or an ID card, a personal identity card, a driver's license, or a bank card, a credit card, an access control identity card, a health insurance card or an arbitrary chip card.

The display module in accordance with various embodiments is distinguished by a cost-effective construction in a corresponding document which is based on a chip card, for example. Furthermore, it can be realized using a minimal number of commercially available components. As explained in some embodiments, there is no need for a separate driver circuit for driving the lighting device since the lighting device can be driven directly by the chip of the display module (chip card module). Moreover, by virtue of the implementation of the display module in accordance with various embodiments in a valuable or security document, user friendliness can be increased by the provision of this user-intuitive interface.

The terms chip card module and display module have been used in the description, and they should be regarded as synonymous. The term display module should be understood to mean a chip card module on which a lighting device is arranged, such that light emission toward the outside (out of the chip card) can be effected, which can be perceived by a user, for example. In this case, the display module can be embedded in a customary chip card of any desired format or can be integrated in an arbitrary valuable or security document.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A chip card module, comprising:
    a chip card module carrier;
    a wiring structure, which is arranged on the chip card module carrier;
    an integrated circuit, which is arranged on the chip card module carrier and is electrically coupled to the wiring structure;
    a chip card module antenna, which is arranged on the chip card module carrier and is electrically coupled to the wiring structure;
    a lighting device, which is arranged on the chip card module carrier and is electrically coupled to the wiring structure; and
    a ring arranged along an edge region of the chip card module carrier, wherein the ring is configured to provide additional mechanical stability to the chip card module.

2. The chip card module as claimed in claim 1, wherein the chip card module carrier comprises a nonconductive carrier substrate.

3. The chip card module as claimed in claim 1, wherein the integrated circuit is designed to drive the lighting device.

4. The chip card module as claimed in claim 1, wherein the lighting device comprises a plurality of discrete illuminants.

5. The chip card module as claimed in claim 1, wherein the wiring structure and the lighting device are formed integrally with the chip card module carrier.

6. The chip card module as claimed in claim 1, wherein the chip card module carrier comprises a reinforced region, in which the integrated circuit is arranged.

7. The chip card module as claimed in claim 6, wherein the reinforced region comprises a material layer having a higher stiffness value than the chip card module carrier.

8. The chip card module as claimed in claim 1, wherein the chip card module antenna is a coil on an opposite side of the chip card module carrier as the wiring structure and is electrically coupled to the wiring structure through feedthroughs in the chip card module carrier.

9. The chip card module as claimed in claim 1, wherein a transparent covering layer is arranged above a surface of the chip card module carrier on which the lighting device is arranged.

10. A method for producing a chip card module, comprising:
    providing a chip card module carrier;
    forming a wiring structure on the chip card module carrier;
    forming an integrated circuit on the chip card module carrier, such that the integrated circuit is electrically coupled to the wiring structure;
    forming a chip card module antenna on the chip card module carrier, such that the chip card module antenna is electrically coupled to the wiring structure;
    forming a lighting device on the chip card module carrier, such that the lighting device is electrically coupled to the wiring structure; and
    forming a ring on the chip card module carrier, wherein the ring is arranged along an edge region of the chip card module carrier, wherein the ring is configured to provide additional mechanical stability to the chip card module.

11. The method as claimed in claim 10, wherein the chip card module carrier is formed from a nonconductive carrier substrate.

12. The method as claimed in claim 10, wherein forming the lighting device comprises forming a plurality of discrete illuminants.

13. The method as claimed in claim 10, wherein the wiring structure and the lighting device are embodied integrally with the chip card module carrier.

14. The method as claimed in claim 10, further comprising: forming a reinforced region on the chip card module carrier, in which the integrated circuit is arranged.

15. The method as claimed in claim 14, wherein the reinforced region is formed from a material layer having a higher stiffness value than the chip card module carrier.

16. The method as claimed in claim 15, wherein the material layer is formed on the chip card module carrier between the integrated circuit and the chip card module carrier; and/or wherein the material layer is formed below the integrated circuit on the opposite side of the chip card module carrier relative to the integrated circuit.

17. The method as claimed in claim 10, further comprising:
   forming the antenna in the form of a coil on an opposite side of the chip card module carrier as the wiring structure, said coil being electrically coupled to the wiring structure through feedthroughs in the chip card module carrier.

18. The method as claimed in claim 10, comprising:
   filling a region above the chip card module carrier, which is laterally delimited by the ring, with a covering material.

\* \* \* \* \*